United States Patent Office 3,736,118
Patented May 29, 1973

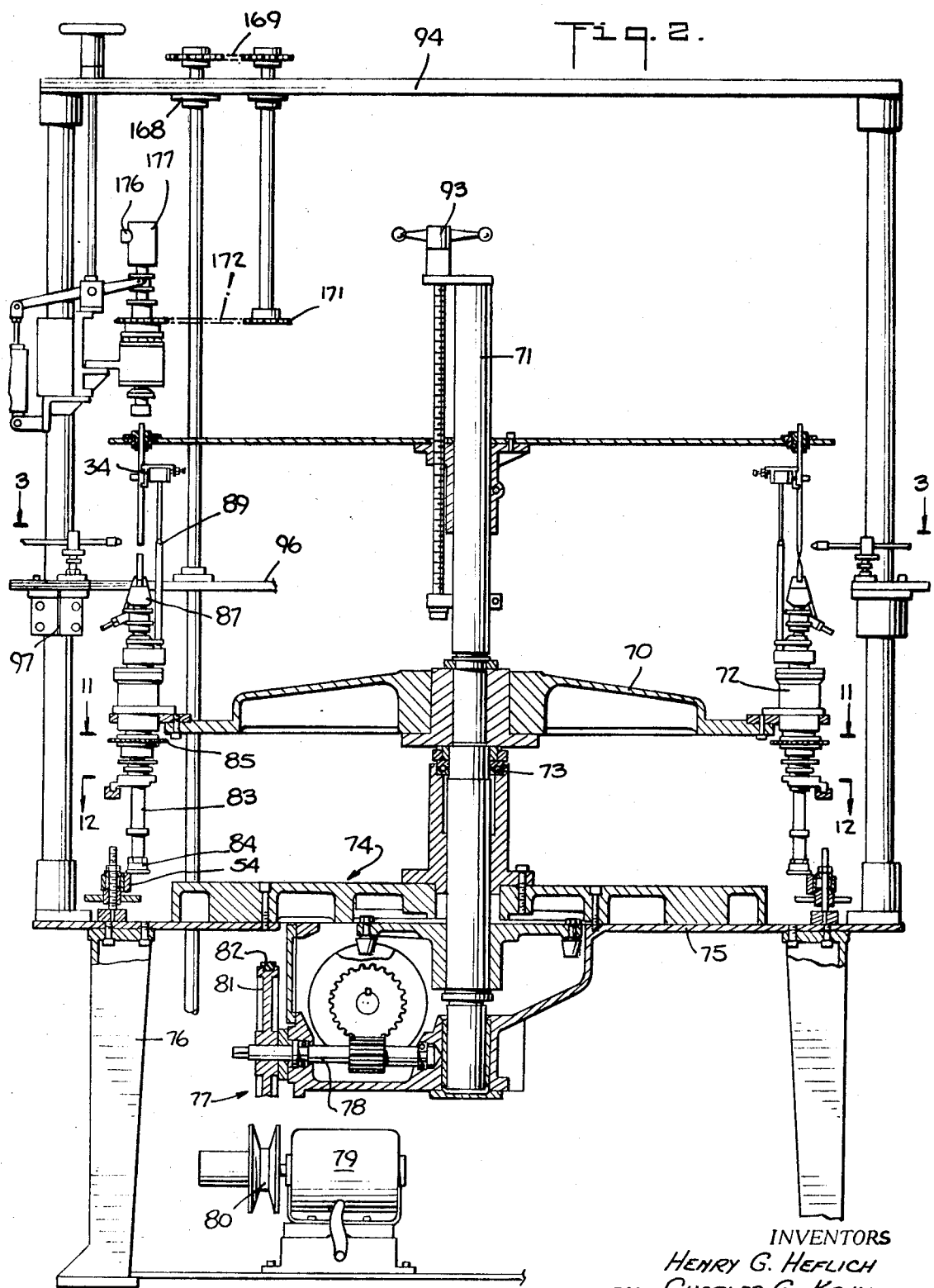

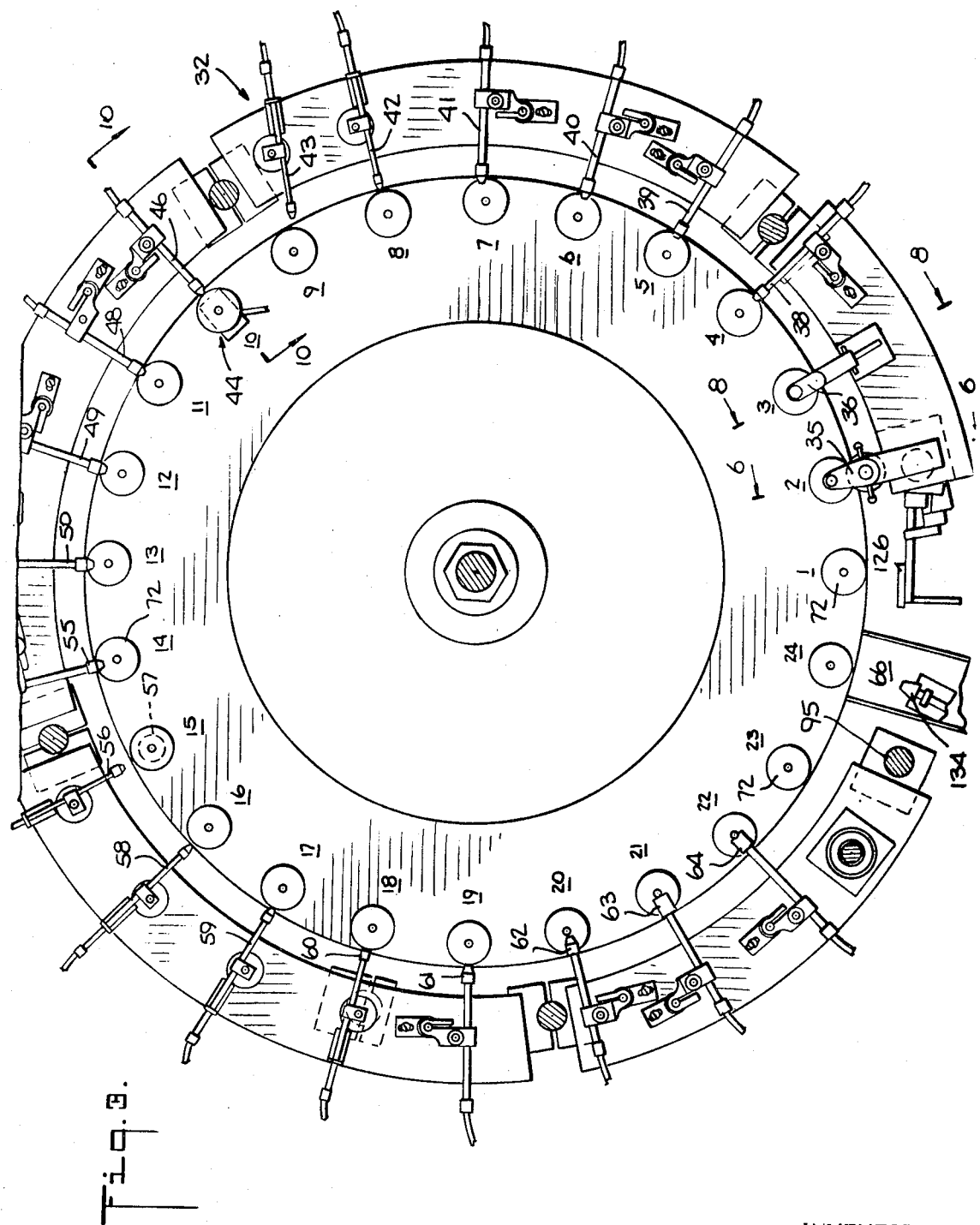

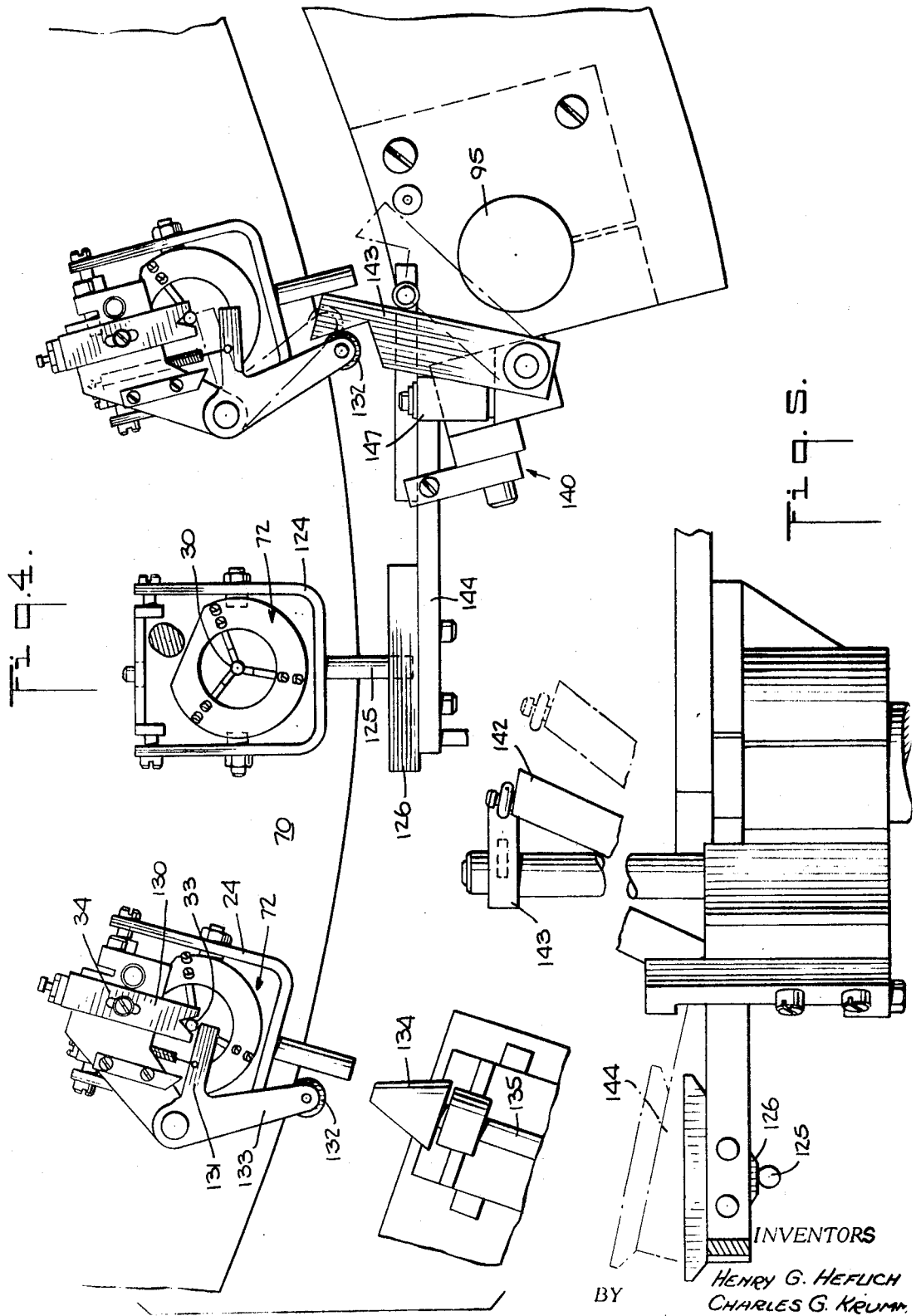

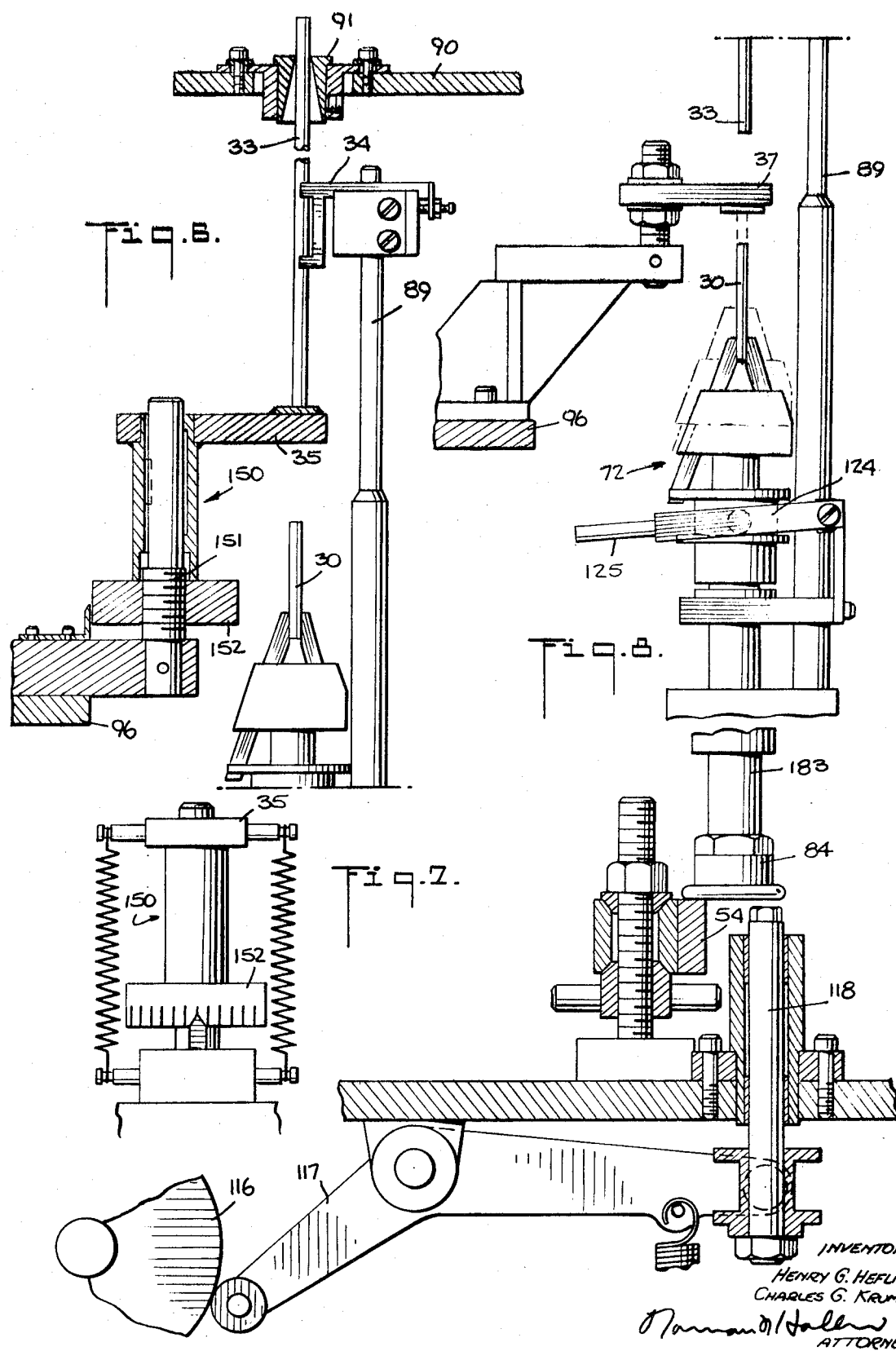

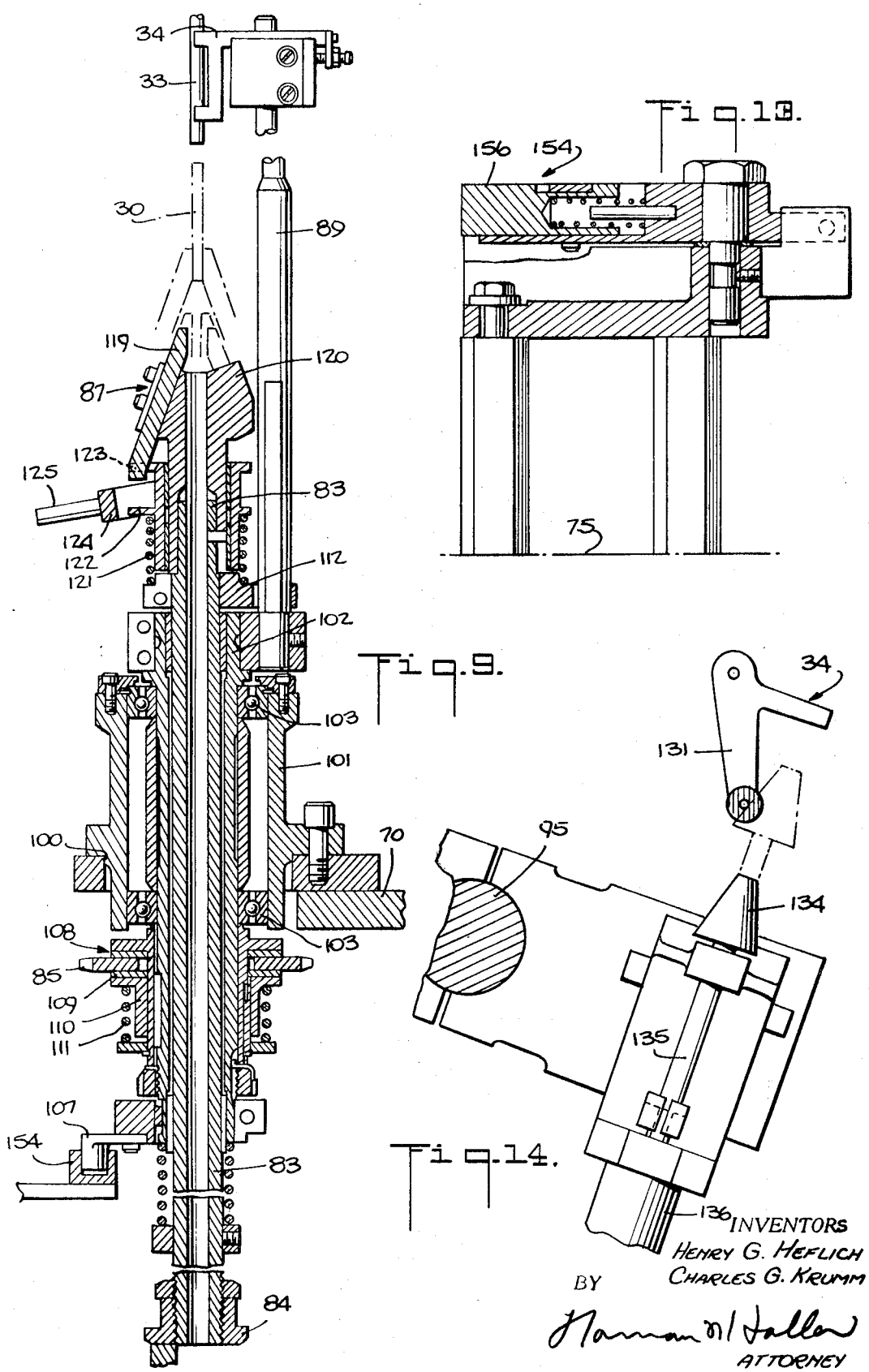

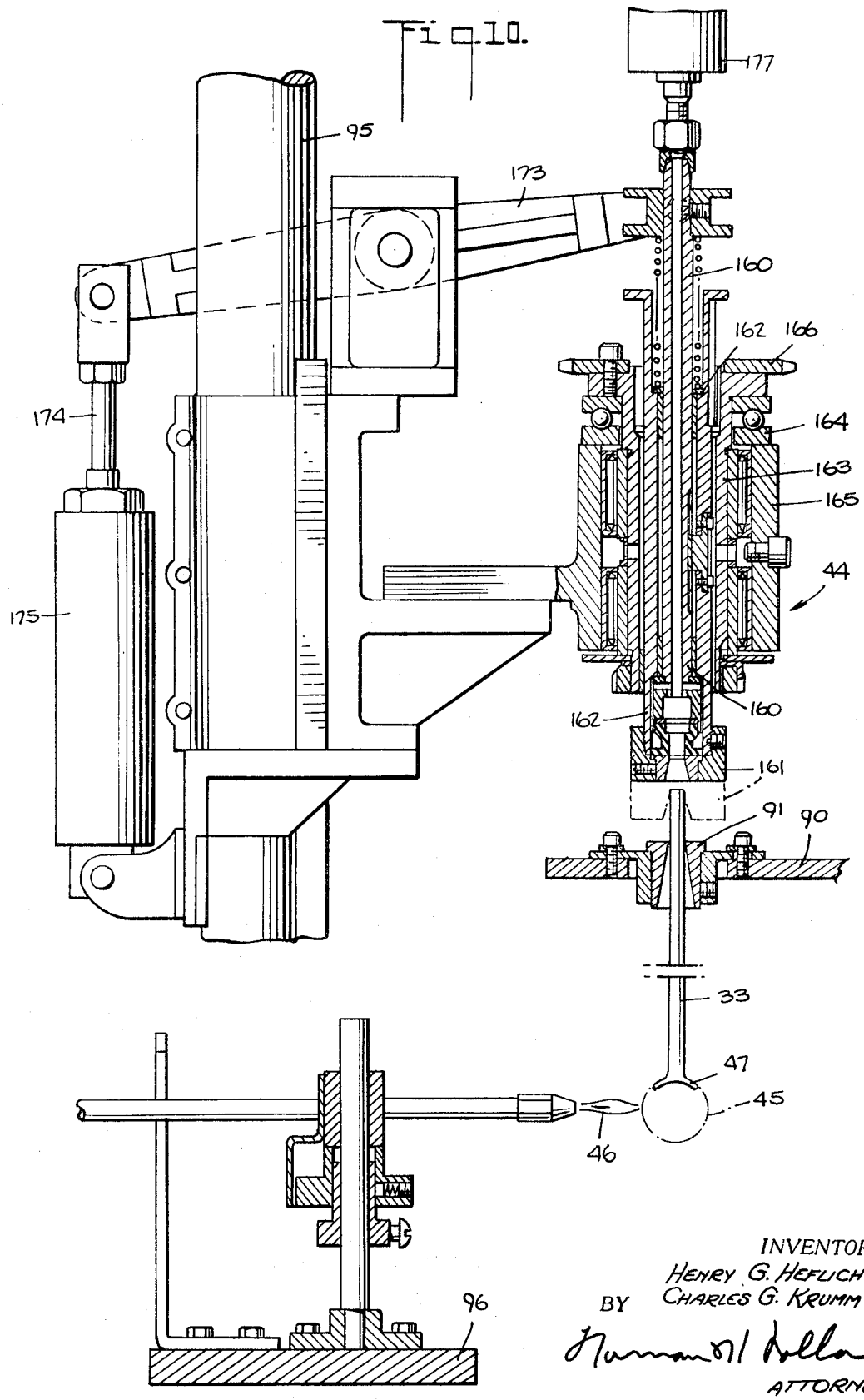

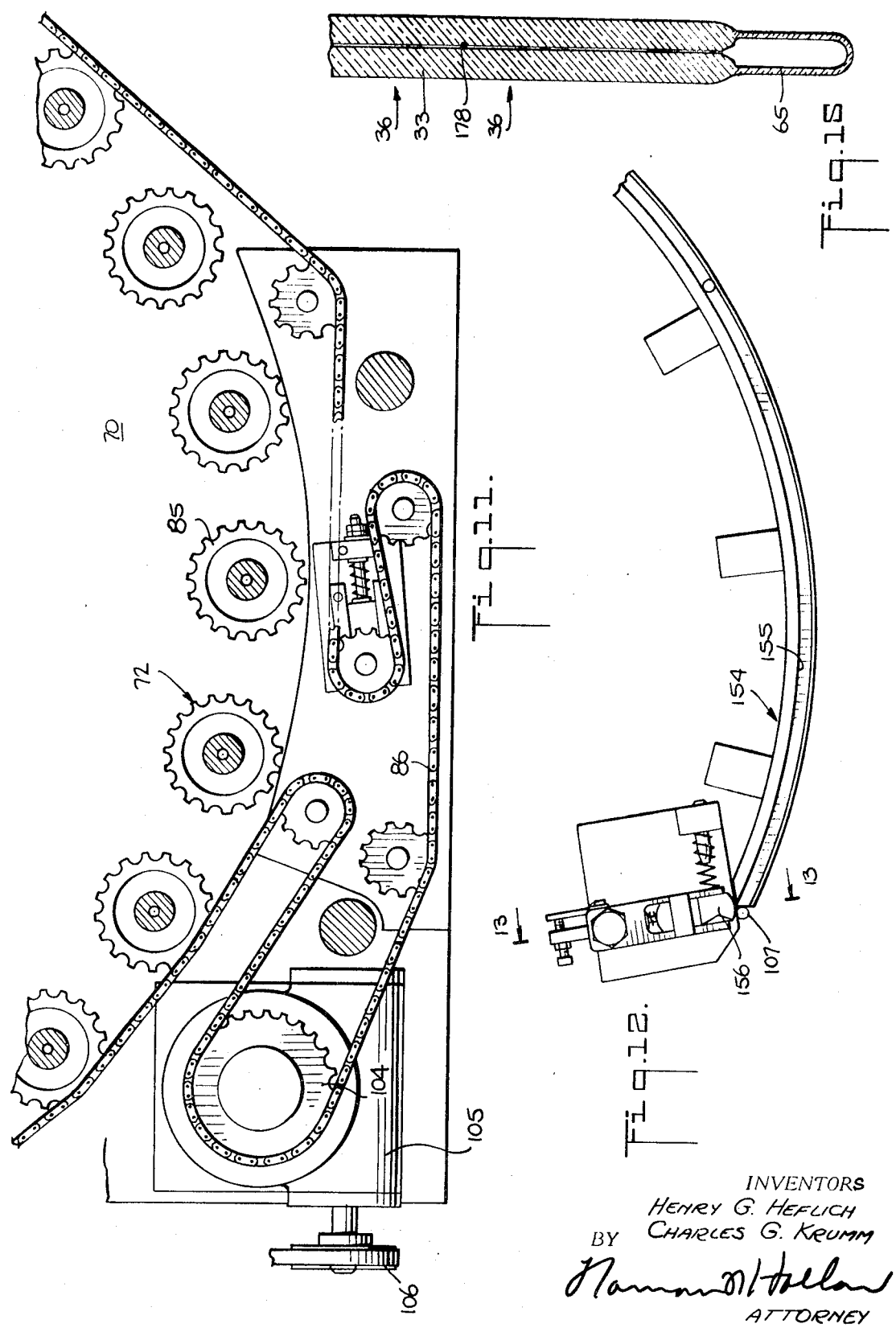

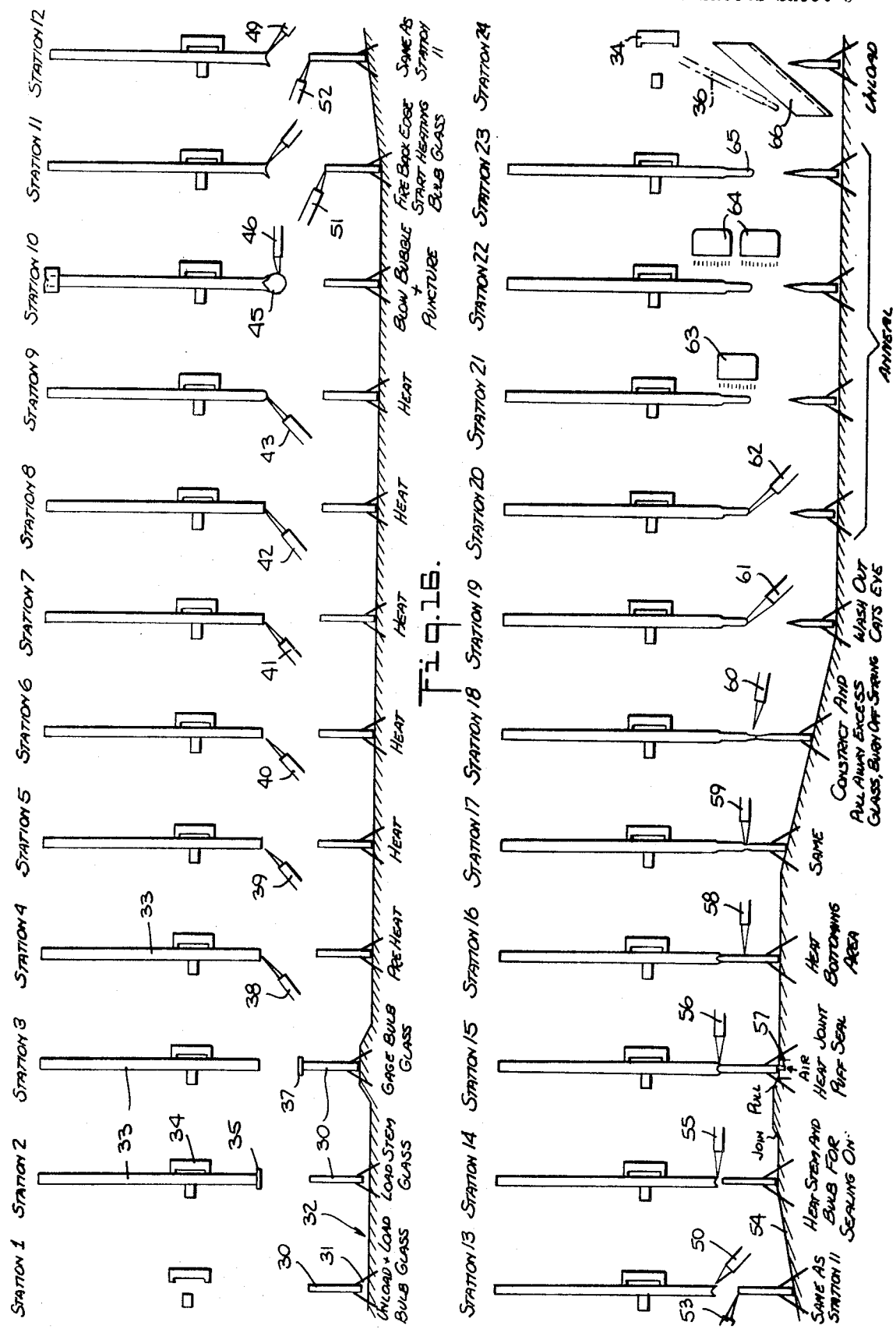

3,736,118
METHOD AND MEANS FOR FORMING A
THERMOMETER BULB
Henry G. Heflich, Ridgefield, and Charles K. Krumm,
Wyckoff, N.J., assignors to Kahle Engineering Co.,
Union City, N.J.
Filed Nov. 5, 1971, Ser. No. 196,097
Int. Cl. C03b 21/00
U.S. Cl. 65—110                                    13 Claims

ABSTRACT OF THE DISCLOSURE

An improved method of manufacturing a thermometer bulb is disclosed together with an automatic machine for performing the new method. The invention covers the manufacture of a liquid thermometer of the usual type which consists of a hollow bulb for containing mercury or other liquid and an attached extending stem including a connected tunnel. The new method includes the formation of the hollow bulb and its connection to the stem capillary tunnel while insuring that there is no blockage between the bulb and the capillary tunnel during manufacture. The method first blows a hollow bubble in the bottom of the stem. Thereafter, this bubble is broken and reshaped to a flared section which is then welded to the upper portion of a hollow glass tube which is then cut and sealed to form the closed bulb. A rotary multi-positioned machine is provided with a number of stations which automatically and successively perform the above described steps.

BACKGROUND OF THE INVENTION

The present invention relates to the manufacture of liquid thermometers and more particularly to an imporved means for forming a hollow bulb at the end of a thermometer stem which communicates with the capillary tunnel in the thermometer stem. Such thermometers are formed from glass by a series of shaping operations and the present invention improves the method by which the thermometer including the bulb is formed and provides improved automatic machinery to accomplish the method.

A variety of methods are now known for forming thermometers using a series of heating and blowing steps One significant drawback in these prior methods, which results in unsatisfactory thermometers, is the failure of the apparatus to maintain communication for the thermometer liquid between the thermometer bulb and the capillary indicator tunnel in the stem. The new method and related machinery overcome this failure by using a novel series of steps in the formation and attachment of the bulb portion to the thermometer stem. The new method, in particular, utilizes an initial bubble blowing step for reshaping the lower end of the stem portion prior to the attachment of the bulb portion which is then given its final shape after attachment to the stem.

Accordingly, an object of the present invention is to provide an improved method and apparatus for manufacturing thermometers.

Another object of the present invention is to provide a method of thermometer manufacture which insures the liquid connection between the thermometer bulb and the stem indicating channel.

Another object of the present invention is to provide a simplified and reliable method for automatically manufacturing thermometers which is adapted for practice on automatic machinery.

Another object of the present invention is to provide an improved apparatus for manufacturing thermometers for use with an improved manufacturing method and alternatively for use on other related methods.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 2 is a vertical sectional view of the forming machine of FIG. 1.

FIG. 3 is a horizontal sectional view of the machine taken along line 3—3 on FIG. 2.

FIG. 4 is an enlarged top plan view of several of the forming stations.

FIG. 5 is a side elevational view of the stem loading station.

FIG. 6 is a vertical sectional view of the stem loading station taken along line 6—6 on FIG. 3.

FIG. 7 is a detailed elevational view illustrating the stop adjustment means at the stem loading station.

FIG. 8 is a vertical sectional view of the bulb glass loading station taken along line 8—8 on FIG. 3.

FIG. 9 is a vertical sectional view illustrating a stem and bulb glass holding chuck mechanism.

FIG. 10 is a vertical sectional view illustrating the bubble blowing station No. 10.

FIG. 11 is a horizontal sectional view illustrating the chain drive for the chucks.

FIG. 12 is a horizontal sectional view illustrating the chuck control cam means.

FIG. 13 is a vertical sectional view of the means of FIG. 12 taken along line 13—13 on FIG. 12.

FIG. 14 is an enlarged detailed plan view of the tube release device.

FIG. 15 is an enlarged sectional view illustrating a typical stem end and bulb of the type formed by the method and machine of the invention.

FIG. 16 is a diagrammatic illustration showing the stem handling and bulb forming operations at the several stations of the machine in accordance with the present invention.

DESCRIPTION OF THE PREFERRED EMBODIMENTS

Figure 1:
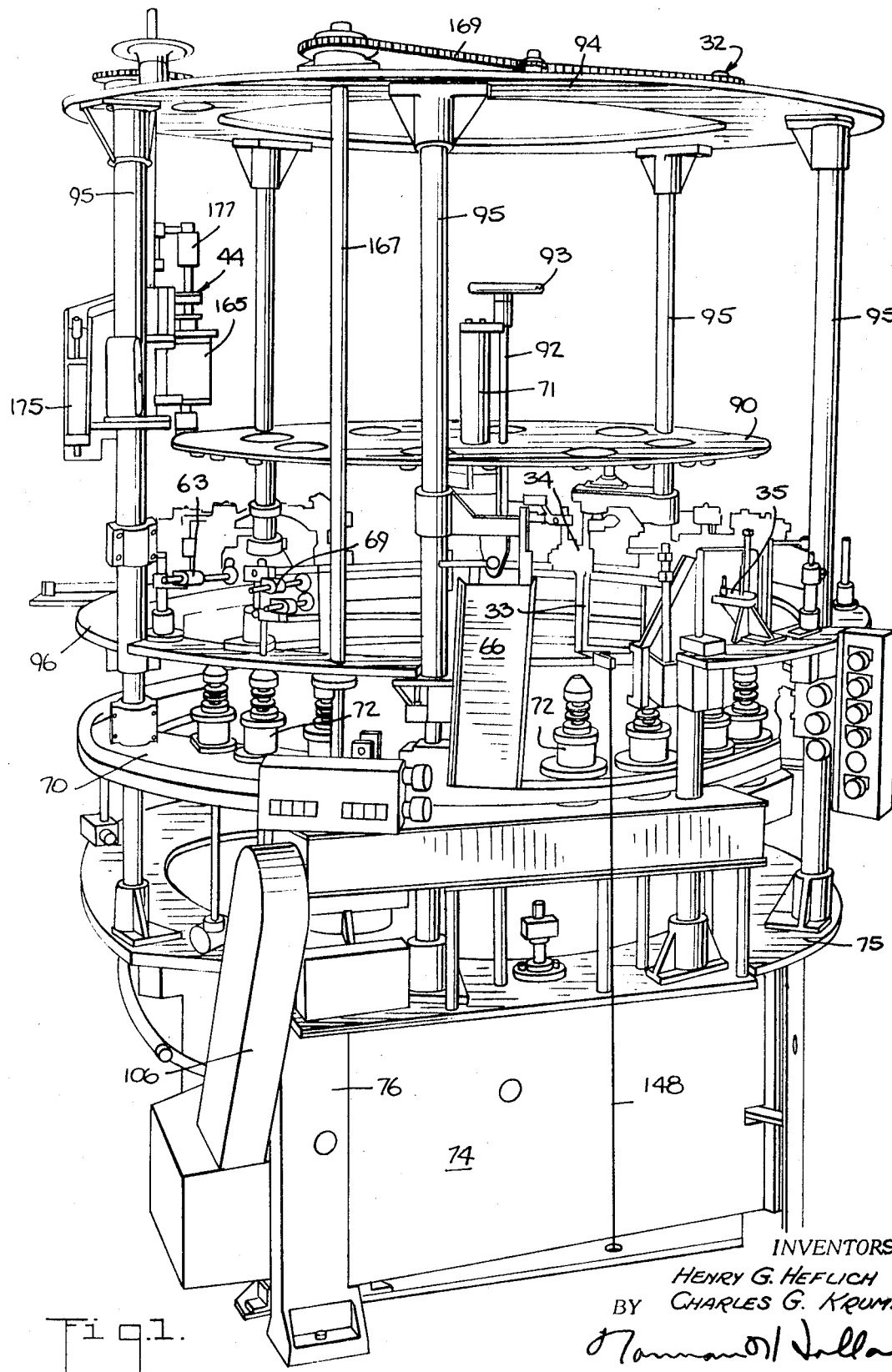
FIG. 1 is a perspective view of a preferred embodiment of the bulb-forming machine.

The new method or process for forming the thermometer utilizing a new series of forming steps will first be described with particular reference to the diagrammatic illustration of the steps shown in FIG. 16.

FIG. 16 illustrates a multi-station operation or method as performed in the stations No. 1 through No. 24 of a preferred machine as will be more fully described below. The machine supports glass stem tubing and bulb glass on a rotatably mounted dial or turret and the tube and bulb glass are advanced by a series of stepped movements of the turret successively to a number of operating stations such as the twenty-four stations illustrated in FIG. 16.

The method of forming the thermometer and particularly of forming the thermometer bulb attached to and in communication with the stem capillary tunnel is specially characterized by a welding operation of the bulb glass to the stem while preserving an open fluid channel between the hollow bulb and the stem capillary tunnel. Prior methods of thermometer manufacture have been unsatisfactory because the hollow bulbs in a significant number of the thermometers have been found to have their outlet to the stem tunnel blocked making them useless.

The improved method of this invention is illustrated diagrammatically in FIG. 16.

Station 1 at the upper left hand side of the figure illustrates a short hollow bulb tube 30 being loaded into a tube support 31 on the machine 32.

Station 2 shows the loading of the upper stem 33 into a suitable clamp 34 positioned above the bulb tube support 31. During the loading operation, the vertical position of the stem 33 is set by the engagement of its lower end with a stem positioning gauge 35.

Station 3 shows the positioning step of the bulb tube whereby it is raised against a gauge 37 and is thereby axially positioned in its support 31.

Stations 4 through 9 illustrate the application of heat to the lower end of the stem 33 by a series of nozzles 38–43 to soften the stem and to close off the lower end of the capillary tunnel.

Station 10 illustrates a blowing step whereby air is directed downwardly through the capillary tunnel in the stem from a blow head 44 so that the soft heated and sealed lower end of the stem 33 is blown into a glass bubble 45. As soon as the bubble 45 reaches a predetermined size which is normally greater than the diameter of the stem 33 material, it is punctured by a flame 46 causing it to collapse to form a flared or funnel-like form 47 at the lower end of the stem 33 and with the capillary tunnel in the stem 33 open and still passing the blowing air.

At stations 11, 12 and 13, the outer edge of the flared portion 47 of the stem is heated by flames 48–50 as the stem 33 rotates and while the bulb glass tube 30 is similarly heated by flames 51–53 and rotated.

At stations 14 and 15, the joining operations between the molten adjacent edges of the bulb glass 30 and the stem 33 is performed by lifting the bulb glass 30 by cam 54 into engagement with the stem 33 while the heating operation is continued by flames 55 and 56.

At station 15, air is continually passed from an air inlet 57 through the bulb tube 30 and the stem 33 to assure that the passage between the bulb 30 and the stem 33 remains open and to facilitate the physical sealing of the upper edge of the bulb glass with the flared adjacent portion 47 of the stem. The control cam 54 is seen to raise the tube 30 to a sealed position on the stem 33 and then to drop slightly to provide a pull action at the soft sealing area of the glass between the bulb 30 and the stem 33.

At stations 16 and 17, a central portion of the bulb tube 30 is heated and softened by flames 58 and 59. Thereafter, at station 18 the lower portion of the bulb tube is drawn away to constrict and seal the bottom of the bulb portion using a flame 60 and the tube 30 is further heated and shaped by a flame 61 at station 19.

At stations 20 through 22, flames 62–64 are directed against the completed bulb 65 to anneal the bulb and adjacent portions of the stem 33 and the cooling portion of the annealing step occurs at station 23. An assembled bulb 65 and stem 33 are unloaded as a completed blank 36 by a suitable chute 66 as the stem supporting clamp 34 is opened at station 24. The remaining portion 67 of the bulb tube is removed at station 1.

THE PREFERRED BULB FORMING MACHINE

A preferred embodiment of the machine 32 which automatically performs the above described steps will now be described beginning with a general description with principal reference to FIGS. 1 and 2.

The main operating element of the machine is the turret 70 rotatably mounted on a center post 71 and having a large number of stem and tube handling chucks 72 positioned at the turret edge. The turret center post 71 is seen to be rotatably mounted in a suitable bearing means 73 on a machine base 74 which includes a generally horizontal base plate 75 and base support legs 76. The center post 71 and its attached turret 70 are intermittently turned or stepped to move tube supporting chucks 72 past the series of bulb forming stations 1 through 24. The turret 70 motion is provided by a roller-type indexing drive 77 which is mounted on the bottom of the machine base plate 75 and which has its main drive shaft 78 coupled to an electric drive motor 79 by pulleys 80 and 81 and a drive belt 82. As long as the drive motor 79 is energized, the center post 71 and its connecting turret 70 continue to turn or step to advance the tube supporting chucks 72 intermittently from one work station to another.

The preferred embodiment of the method described above is conveniently performed by presenting each tube and stem supporting chuck 72 to twenty-four work stations positioned around the turret 70 where the already described bulb forming and attaching steps are automatically performed. The chucks 72 are mounted at the turret 70 edge, and as will be more fully described below, each includes a lift spindle 83 with a sliding cam follower 84 at its lower end for engaging and following the circular positioning cam 54. The chucks 72 are all continuously rotated about their own axis along a substantial portion of a turret 70 revolution through the intermediate individual sprockets 85 on each chuck which engage an endless drive chain 86 (FIG. 11). Releasable jaw members 87 are mounted at the top of each chuck 72 for releasably engaging the bulb tubes 30 during the bulb forming operation.

The stem portions 33 of the thermometer assemblies are releasably supported above the chucks 72 by means of a releasable clamp 34. These clamps 34 are each supported on a vertical support rod 89 which is attached to the underlying chuck 72. In order to provide support for the upwardly extending thermometer stems 33, a generally circular dial plate 90 including stem support guide members 91 is mounted on the center post 71. The vertical position of this dial plate is controlled and adjusted by the screw rod 92 which is threadably connected with the dial plate and which is rotated by means of the adjusting handle 93 to change the vertical position of the dial plate 90. A suitable support frame is provided for the various glass shaping tools and devices which includes a top plate 94 mounted on a number of vertical support posts 95 and a tool supporting ring 96 encircling the chucks 72 and adjustably mounted on the posts 95 by means of suitable brackets 97. The various heating and shaping flames are provided by nozzles adjustably positioned on support brackets on the ring 96 and the bubble forming blow head 44 is adjustably mounted above the path of the chucks 72 on one of the vertical support posts 95.

THE STEM AND TUBE SUPPORTING CHUCKS

A preferred embodiment of the tube supporting spindles or chucks 72 is illustrated in detail in FIG. 9. A number of these chucks 72 are bolted into suitably positioned apertures 100 provided at the outer edge of the turret 70. These chucks 72 each include an outer bearing housing 101 which rotatably supports a hollow spindle 102 held in spaced ball bearings 103. The spindles 102 are rotated at a number of the work stations through the intermediation of drive sprockets 85 driven by the endless chain 86 which, as seen in FIG. 11, is continuously driven from a drive sprocket 104 on right angled drive 105 which is coupled at 106 (FIG. 1) to the main drive motor 79.

In order to permit the spindle rotation to be stopped at the loading and unloading stations 1, 2, 3, and 24 by means of a stop arm 107 on the spindle 102, the sprocket 85 is coupled to the spindle 102 by means of a slip clutch 108 including a pair of coupling clutch discs 109 and a slidable clutch member 110 normally held in its engaged position by a compressed coil spring 111.

An inner lift spindle 83 is mounted within the outer spindle 102 with a drive coupling 112 to spindle 102 which permits the vertical position of the inner spindle 83 to be adjustably controlled at the work stations through the intermediation of the cam follower 84 and the circular jaw control cam 54. The spindle 102 is raised and lowered by the cam 54 during the various steps described above in connection with the description of FIG. 16. Additionally, a bulb tube positioning mechanism is provided for lifting the inner spindle 83 at station 3. This mechanism (FIG. 8) includes the adjustable stop gauge 37 which engages the bulb tube 30 to force it downwardly to a precise axial position within the tube gripping jaws 87 as the inner spindle 83 is raised a predetermined amount through the intermediation of a rotary cam 116, a spring loaded crank arm 117, and the connected lift rod 118. The cam 116 is driven by a suitable coupling with a continuously rotating portion of the indexing drive 77. The bulb glass gripping jaws 87 are seen to include jaw members 119 slidably mounted on the conical end portion 120 of the inner drive shaft 83 so that they are urged towards a closed gripping position by the compressed coil spring 121 acting against the slidable spool member 122 and its pin-like coupling 123 to the lower end of the jaw members 119. A pivotally mounted yoke 124 having an operating pin 125 lowers the jaws 119 to their opened position as seen in FIG. 9, against the force of the coil spring 121 when its operating handle 125 engages an opening cam 126 at the loading station 1 (FIG. 4).

THE STEM AND BULB GLASS LOADING AND POSITIONING MEANS

As will become evident from the detailed discussion of the bulb forming and attaching operations which will be given below, a precise relative positioning of the lower end of each piece of glass stem 33 and of the upper end of each glass bulb tube member 30 is essential to insure the satisfactory operation of the method and apparatus. The preferred embodiment of the means for unloading completed thermometer blanks 36 and for then loading and spacing the stems 33 and bulb tubes 30 will now be described with particular reference to FIGS. 4 through 8.

After the completion blank 36 is carried in its supporting chuck 72 to station 24 where the stem support clamp 34 is opened and the blank 36 drops clear of the machine to an inclined exit chute 66 (FIG. 1). The stem holding clamp 34 which is mounted on the rod-like extension 89 of the chucks 72 includes the notched and fixed stem engaging jaw 130 (FIG. 4) and a pivotally mounted jaw member 131 formed as a crank and including a jaw opening cam roller 132 rotatably mounted on the arm 133 of the jaw member 131. The jaw member 131 is positioned at station 24 adjacent to a jaw opening member 133 in the form of a conical cam 134 attached to the end of a drive rod 135 on an air cylinder 136 (FIG. 14). When the chuck 72 is moved to station 24, the air cylinder 136 is activated by a cam operated switch to move the conical cam 134 against the cam roller 132 thereby swinging the jaw member 131 clear of the glass stem 33 and permitting the completed blank 36 to drop downwardly into the exit chute 66.

FIG. 4 also illustrates an operating member 140 for simultaneously opening the bulb glass jaws 119 at station 1 and the stem glass clamp 34 at station 2. FIGS. 4 and 5 show the foot-operated operating member 140 in which an L-shaped jaw opening crank 141 is rotated in a clockwise direction to open the stem holding chuck 34 as crank arm 142 turns the pivoted rod 143 against cam roller 132 and permitting a new stem 33 to be dropped in against spacing stop 35. The bulb glass chuck handle 125 which has already been described in connection with FIG. 9, is simultaneously moved downwardly by the crank arm 144 thereby drawing the several chuck jaw members 119 downwardly (FIG. 9) to their open position permitting the used bulb glass to be removed and a new section 30 to be dropped into the jaws 119. The operator manipulates a foot pedal 146 to turn the jaw and clamp operating crank 141 on its pivot 147 through the action of a vertical coupling chain 148 (FIG. 1). As already indicated above, a bulb glass 30 vertical positioning means including the cam operated lift rod 118, as illustrated in FIG. 8, is automatically actuated as each chuck is moved to station 3 to precisely fix the vertical position of the bulb glass 30 by forcing it upwardly against the stop plate 37. FIGS. 6 and 7 illustrate a fine adjustment means 150 for the stem positioning stop including a threaded mounting post 151 and a threaded and indicating knob 152.

At the above described unloading and loading and tube positioning stations 24, 1, 2 and 3, the chucks 72 are disconnected from the drive chain 86, (FIG. 11) and the stop arm 107 engages a chuck positioning cam 154 (FIGS. 9, 12 and 13) to stop chuck rotation with the clamps 34 and the chuck opening yokes 124 properly positioned for the above described loading operations.

The cam 154 has an elongated slot 155 for receiving and positioning the chuck stop arm 107. The stop arm 107 first engages a resiliently mounted positioning guide 156 at the cam 154 entrance to guide the stop arm 107 into the cam slot 155. Depending upon the particular rotary position of each chuck 72 at station 24, the stop 107 either turns against the guide 156 or strikes spring guide 156 and is swung by it into the cam slot 155.

After the stem 33 and the bulb tube 30 have been loaded and precisely positioned in the chucks 72, the chucks 72 are advanced through the several shaping and attaching stations 4 through 20 where the bulb tube 30 is attached to the bottom of the stem 33 and is closed off to form the liquid containing bulb.

The next station beyond the loading station 3 is station 4 where the gas flame 38 is directed against the bottom of the stem tube 33 in a preheating operation. At the next five stations 5 through 9, the heating of the bottom of the stem is continued with the flames 39–43 from the heating nozzles being precisely positioned to soften a band or zone immediately adjacent the lower edge of the stem 33. The heating is adjusted at the five stations to cause the glass to melt and flow at station 9 to close off the lower end of the capillary tunnel in the stem 33.

At station 10 the blow head 44 automatically drops into engagement with the upper end of the stem 33 to connect a source of blowing air or other gas to the capillary passage in the stem 33. The blowing air which is now directed downwardly through the stem 33 causes a bubble 45 to form on the bottom of the stem 33. This bubble 45 is expanded so that a spherical hollow glass bubble results preferably having a diameter somewhat greater than the diameter of the glass stem 33. When the bubble reaches this size, it is pricked by the pinpoint flame 46 which causes the bubble 45 to collapse and the bubble glass to reform itself as a fluted or flared end 47 on the glass tubing 33. Since the blowing operation is continued during and after the collapse of the bubble, the passage of the capillary channel through the flared end 47 of the stem 33 is assured.

THE BLOW HEAD FOR THE STEM BUBBLE FORMING STATION

As described in the above discussion of the preferred method steps for forming the bulb 65 on the stem end 33, an important step comprises the blowing of a glass bubble 45 at the stem bottom at station 10. FIG. 10 illustrates a preferred embodiment of the bubble blowing head 44 positioned at station 10.

It includes a hollow blow tube 160 and a coupling 161 communicating with the lower end of the tube 160 which is moved into engagement with the upper end of each stem 33 at station 10. Since the stem 33 is being heated by a flame 46 and is continuously rotating, the coupling 161 is also rotated in synchronism with the rotating stem 33. For this purpose, the coupling 161 is attached to an inner sleeve 162 positioned for axial movement within a rotatably mounted bearing member 163 which is attached by a ball bearing 164 to the stationary support bracket 165 mounted on a vertical post 95. The bearing member 163 has a sprocket 166 coupled to it and this sprocket 166 is driven by a coupling to the continuously rotating main drive motor 79 (FIG. 1) through the intermediation of a vertical drive shaft 167 having its upper bearing 168 on the top plate 94 and a drive chain 169 above the top plate and which continuously turns an additional vertical drive shaft 170 having a sprocket 171 and chain 172 at its lower end engaging the blow head sprocket 166. The bearing member 163 is coupled to the inner support sleeve 162 so that it rotates the sleeve 162 while permitting vertical movement of the sleeve 162 on the non-rotating inner blow tube 160. It is thus seen that the coupling 161 for engaging the stem 33 continuously rotates while it is fed with air through its hollow center from the non-rotating inner blowing tube 160. The vertical position of the coupling 161 is controlled by a control crank 173 coupled at its inner end to the blowing tube 160 and pivotally attached to a piston 174 of an air cylinder 175 at its outer end. A source of air for the blowing operation is fed into the hollow upper end of the blowing tube 160 through an air valve 177 which is mounted on the end of the blow tube 160 and which is given freedom of movement through the use of a flexible air supply tube 176 which is coupled to the source of air under pressure. The air cylinder 175 and the air valve 177 are operated during the dwell time for the turret through the intermediation of suitable control cams which are conveniently mounted on or coupled to the main drive system as, for example, by being positioned on the main drive shaft 78 or another interconnected and continuously rotating cam shaft.

The lower portion of FIG. 10 illustrates the blowing operation at this station. When the stem 33 arrives at the station 10, the lower end of the stem capillary tunnel 178 has been closed off by the shaping flame 43 at station 9. In addition, the lower end of the stem 33 has been softened until it is plastic. After the blow head 44 has been moved into position and the valve 177 opened, the air pressure within the capillary tunnel blows the glass bubble 45 on the end of the stem 33. When the bubble 45 reaches a predetermined diameter which may be about two or three times the stem diameter, the bubble 45 approaches the tip of the fine flame 46 mounted at this station on the support ring 96. This flame 46 pricks or breaks the bubble 45 causing it to assume a flared conical shape of the general form illustrated in solid lines at 47. Since air continues to be blown into the stem 33 and through the capillary tunnel 178 during the collapse and reforming of the bubble glass, the lower end of the capillary tunnel 178 will remain open during this operation thereby insuring communication between the capillary tunnel 178 and the bulb 65 during the subsequent bulb attaching and forming steps at stations 11 through 20.

THE BULB ATTACHMENT AND SHAPING

At the following station 11, nozzles 48 and 51 (FIGS. 3 and 16) are directed against the edge of the flared portion 47 of the stem 33 and against the upper edge of the bulb tube 30 preparatory to the joining of these edges together. This edge heating is continued at stations 12 and 13 by nozzles 49, 50, 52 and 53. At station 14, the heating of the stem edge 33 is continued by flame 55 while the bulb tube 30 is raised towards the stem by cam 54 and the joint between the stem 33 and the bulb tube 30 is formed at station 15. During the formation of the joint at station 15, the junction of the stem 33 and bulb tube 30 is heated with a flame 56 while a puff of air from the air outlet 57 (FIGS. 3 and 16) is directed upwardly through the attached bulb tube 30 and stem 33 to assist in the formation of the junction and to insure the continued communication of the capillary passage 178 with the hollow center of the bulb tube 30.

At stations 16 and 17, a central portion of the bulb tube 30 is heated by flames 58 and 59 to soften this portion and to cause it to constrict so that a downward movement of the bottom of bulb glass 30 at station 18 causes a final constriction and sealing off of the thermometer bulb 65.

At stations 19 and 20, flames 61 and 62 are directed upwardly against the newly formed bottom seal on the bulb 65 to smooth it off and to round the bottom of the bulb 65.

At stations 20 through 22, multi-burner nozzles 63, 64 and 65 are directed against the bulb 65 and adjacent portions of stem 33 to heat and to temper the completed bulb and stem assembly 36.

At station 23, all heating is removed and the completed thermometer tube blank 36 is permitted to harden and cool preparatory to its being released from the clamps 34 and dropped into the exit chute 66 at station 24.

During all of the above operations for stations 4 through 23, the chucks 72 and the supported bulb tubes 30 and stems 33 are continuously rotated to insure a uniform heating and shaping of the glass during the above described operations.

It will be seen that an improved method has been disclosed for forming glass liquid-type thermometers of the type having a liquid bulb at the bottom end of a glass stem which communicates with a capillary tunnel for providing the temperature indication. The improved method permits the manufacture of glass thermometers by fully automatic machinery including a number of steps which form the thermometer stem and bulb assembly and which insure a proper fluid coupling between the thermometer bulb and the capillary tunnel in the stem. The method is not only adaptable for automatic machine operation but it is also adaptable for a high speed and precise operation which eliminates waste and other loss by reliably forming a perfect glass thermometer and bulb assembly for filling and sealing.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A method of forming a glass liquid-type thermometer including a stem with a capillary tunnel and a communicating liquid storage bulb comprising the steps of:
   providing a length of glass tubing with a capillary tunnel therethrough;
   supporting said tubing at a pre-set position;
   providing a thin walled glass tube;
   positioning said tubing in axial alignment with said thin walled tube and providing a predetermined spacing between the adjacent ends of the tubing and the tube;
   heating the said adjacent end of the tubing and closing off the capillary tunnel at the heated end;
   directing air under pressure into the opposite open end of the capillary tunnel thereby blowing a glass bubble in the closed-off end of the tubing;
   puncturing the bubble whereby it assumes an outwardly flared shape on the tubing end;
   heating the flared end of the tubing and the adjacent end of the tube to soften them;
   moving the heated ends together and fastening the tube and tubing together while passing air between the tube and the capillary tunnel to keep them in communication;
   heating an intermediate portion of the tube thereby closing it off and forming a closed end on the tube for forming a thermometer bulb in communication with the capillary tunnel in the stem; and
   annealing the closed-off bulb and an adjacent portion of the glass stem.

2. The method as claimed in claim 1 which comprises the further step of stretching the tube during the heating of its intermediate portion for constricting the intermediate portion for facilitating the formation of the closed end.

3. A method of forming a glass liquid-type thermometer including a stem with a capillary tunnel and a communicating liquid storage bulb comprising the steps of:
providing a length of glass tubing with a capillary tunnel therethrough;
providing a thin walled glass tube;
heating an end of the tubing and closing off the capillary tunnel at the heated end;
directing air under pressure into the opposite open end of the capillary tunnel and blowing and collapsing a glass bubble on the closed tube end forming an outwardly flared tubing end;
heating the flared end of the tubing and an end of the tube to soften them;
moving the heated ends together while passing air through the tube into the capillary tunnel in the tubing as the tubing and tube are fastened together; and
heating and closing off an intermediate portion of said tube after it is fastened to said tubing to form a closed liquid bulb in communication with said capillary tunnel.

4. Apparatus for forming a glass liquid-type thermometer including a stem with a capillary tunnel and a communicating liquid storage bulb comprising the combination of:
a support for a length of glass tubing with a capillary tunnel therethrough;
a support for a thin walled glass tube positioned for placing said tubing in axial alignment with said thin walled tube and for providing a predetermined spacing between adjacent ends of the tubing and the tube;
first heating means positioned for heating the said adjacent end of the tubing and for closing off the capillary tunnel at the heated end;
a source of air under pressure coupled to the opposite open end of the capillary tunnel for blowing a glass bubble at the closed-off end of the tubing;
second heater means positioned adjacent to the said adjacent end of said tubing for puncturing the blown bubble whereby it assumes an outwardly flared shape on the tubing end;
third heater means positioned for heating the flared end of the tubing and the adjacent end of the tube to soften them;
means for mounting said tube support and said tubing support for providing relative axial movement;
drive means for moving the heated tube and tubing ends together for fastening the tube and tubing together;
a source of air coupled for passing air between the tube and the capillary tunnel during their fastening to keep them in communication; and fourth heater means positioned for heating an intermediate portion of the tube thereby closing it off and forming a closed end on the tube and a thermometer bulb in communication with the capillary tunnel in the tubing.

5. The method as claimed in claim 3 which further comprises the step of annealing the connection between said tubing and said tube.

6. Apparatus as claimed in claim 4 which further comprises additional heater means for annealing the connection between said tubing and said tube.

7. Apparatus as claimed in claim 4 in which said means for supporting said tubing and said tube comprises a rotatably mounted turret with tubing and tube supporting chucks positioned at its periphery.

8. Apparatus as claimed in claim 7 which further comprises drive means coupled to said chucks for rotating said chucks.

9. Apparatus as claimed in claim 4 in which said means for directing air into the capillary tunnel comprises a movably mounted air coupling including means for rotating said coupling in synchronism with said chucks.

10. Apparatus as claimed in claim 8 which further comprises stop means for periodically stopping the chuck rotation comprising a stop member on each chuck and an elongated stop cam mounted adjacent to the turret for engaging the stops.

11. Apparatus as claimed in claim 7 which further comprises stop means for precisely controlling the axial position of the tube and tubing in the chucks.

12. Apparatus as claimed in claim 11 in which the stop means for positioning said tube includes an adjustable stop member and a movable rod for raising each tube against said adjustable stop.

13. The method as claimed in claim 3 which comprises the further step of stretching the tube during the heating of its intermediate portion for constricting the intermediate portion for facilitating the formation of the closed end.

References Cited

UNITED STATES PATENTS

| 1,767,923 | 6/1930 | Githler | 65—Dig. 9 |
| 2,990,648 | 7/1961 | Chaney | 65—Dig 9 |
| 3,689,339 | 9/1972 | Klingler | 65—62 X |

FOREIGN PATENTS

| 553,599 | 5/1923 | France. |

ROBERT L. LINDSAY, JR., Primary Examiner

U.S. Cl. X.R.

65—105, 113, 166, 174, 285